Feb. 20, 1934. J. T. EUBANK 1,947,978
HOOD APPLYING MACHINE FOR MILK BOTTLES
Filed Nov. 6, 1931 7 Sheets-Sheet 2
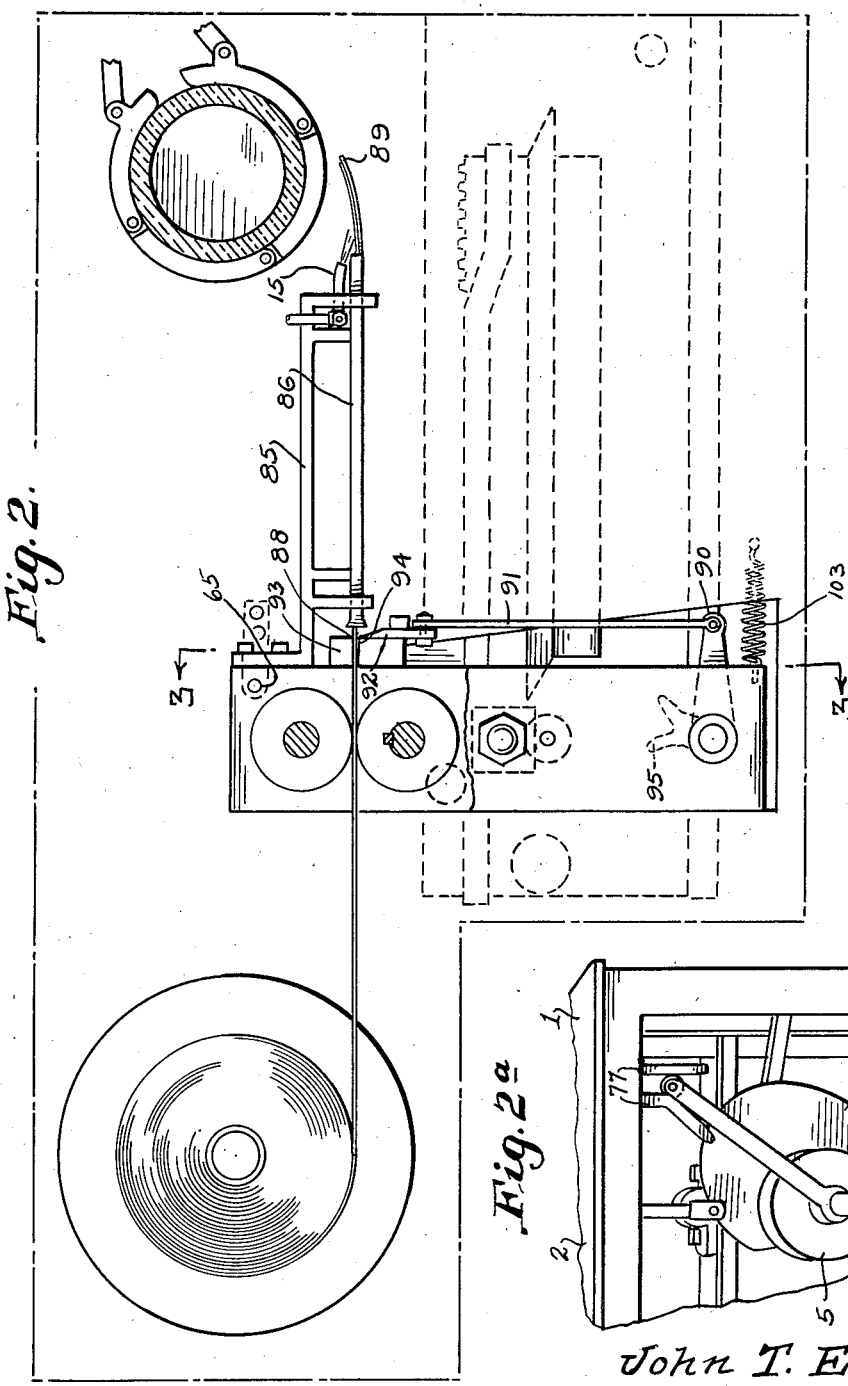
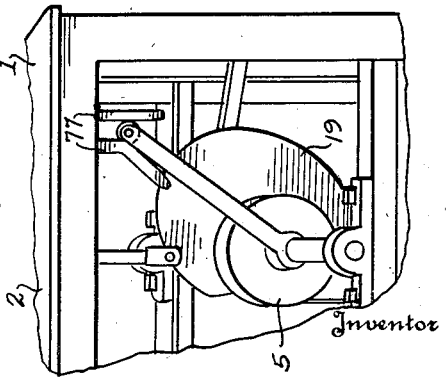

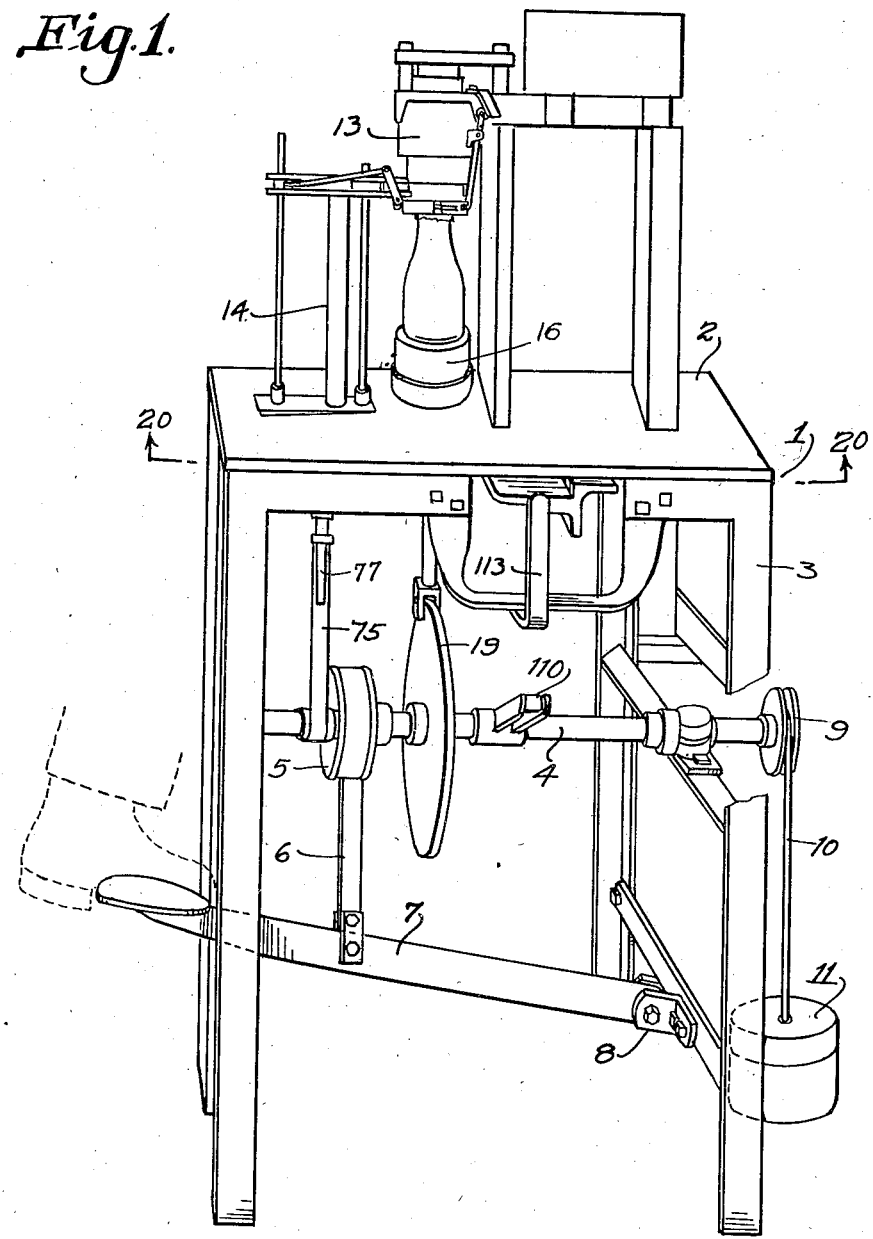

Feb. 20, 1934. J. T. EUBANK 1,947,978
HOOD APPLYING MACHINE FOR MILK BOTTLES
Filed Nov. 6, 1931 7 Sheets-Sheet 3
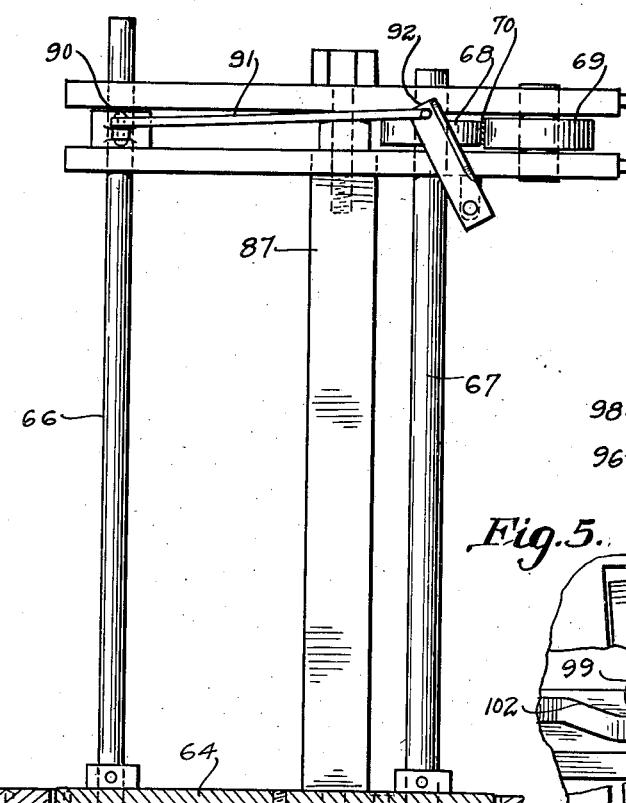
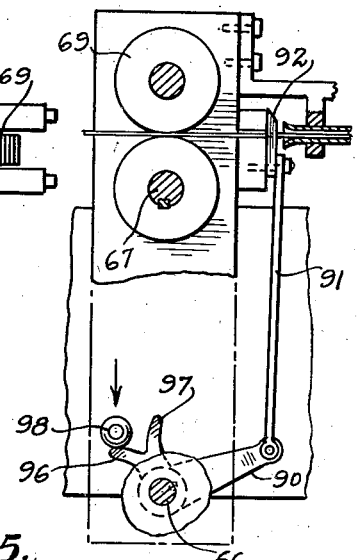
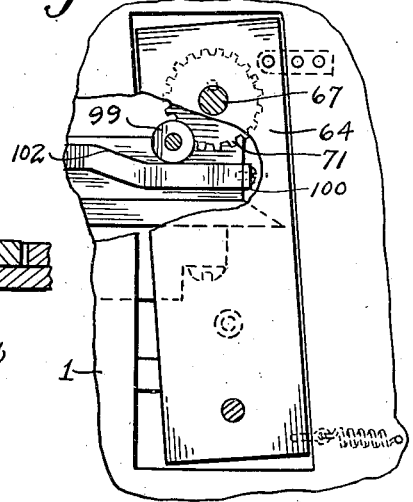
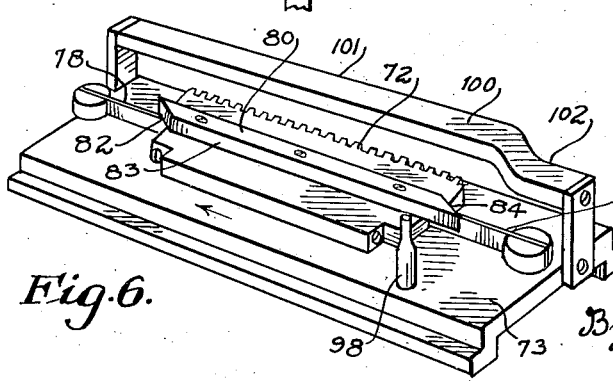
Inventor
John T. Eubank
By Mason Fenwick & Lawrence
Attorneys Feb. 20, 1934.   J. T. EUBANK   1,947,978
HOOD APPLYING MACHINE FOR MILK BOTTLES
Filed Nov. 6, 1931   7 Sheets-Sheet 4
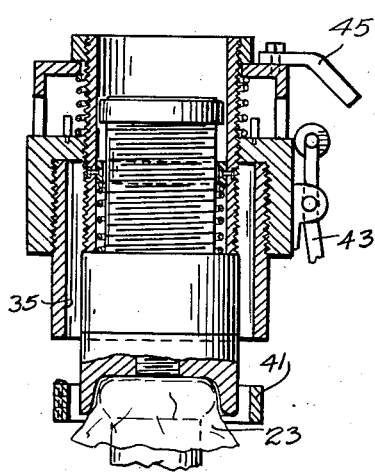
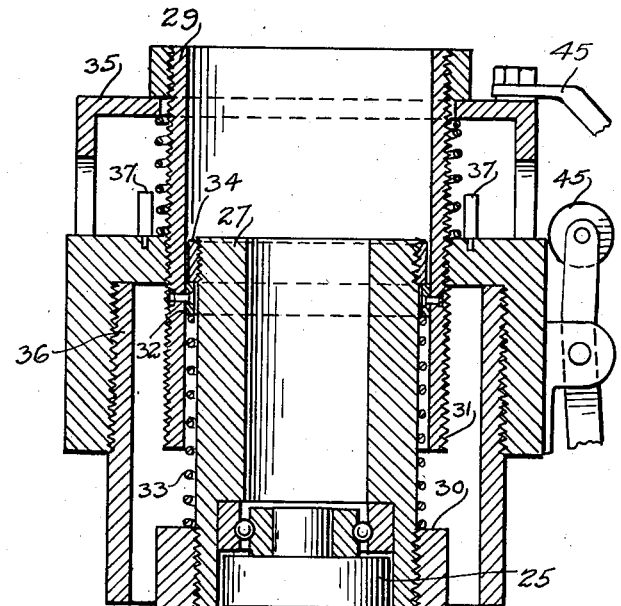
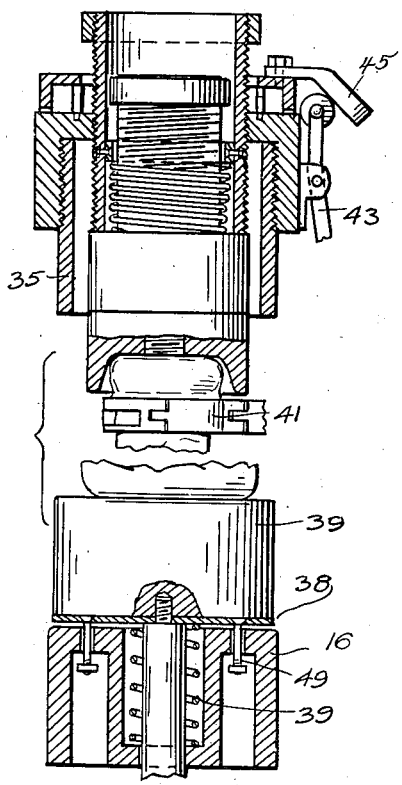
Inventor
John T. Eubank
By Mason Fenwick & Lawrence
Attorneys Feb. 20, 1934.  J. T. EUBANK  1,947,978
HOOD APPLYING MACHINE FOR MILK BOTTLES
Filed Nov. 6, 1931    7 Sheets-Sheet 5
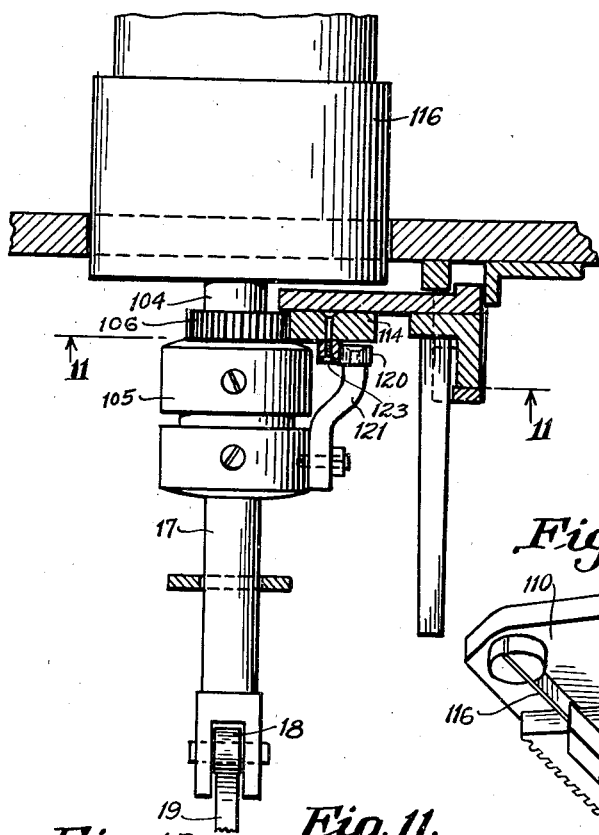
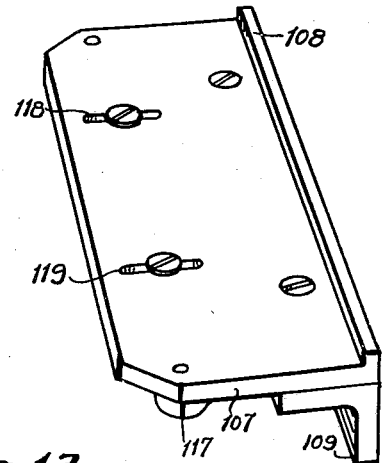
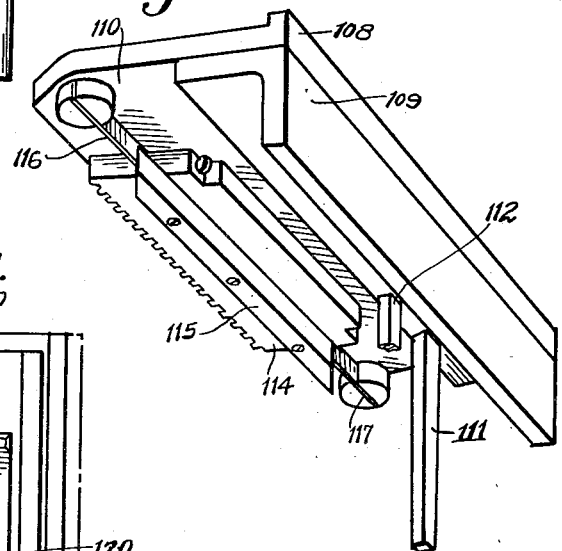
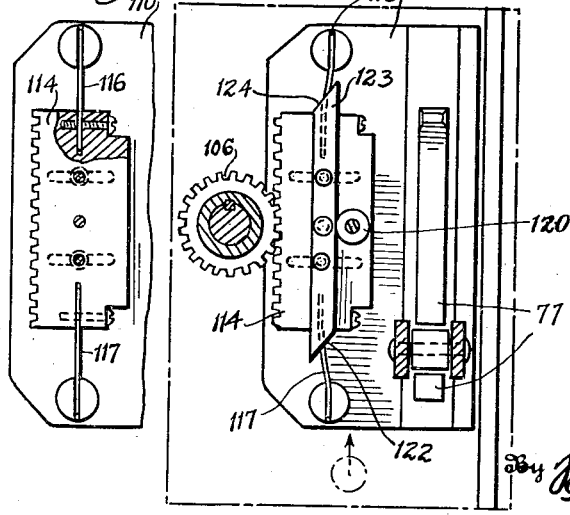
Inventor
John T. Eubank
By Mason Fenwick & Lawrence
Attorneys Feb. 20, 1934.　　　　J. T. EUBANK　　　　1,947,978
HOOD APPLYING MACHINE FOR MILK BOTTLES
Filed Nov. 6, 1931　　　7 Sheets-Sheet 6

Inventor
John T. Eubank
By Mason Fenwick & Lawrence
Attorneys

Feb. 20, 1934.  J. T. EUBANK  1,947,978
HOOD APPLYING MACHINE FOR MILK BOTTLES
Filed Nov. 6, 1931  7 Sheets-Sheet 7

Inventor
John T. Eubank
By Mason Fenwick & Lawrence
Attorneys

Patented Feb. 20, 1934

1,947,978

UNITED STATES PATENT OFFICE 1,947,978

HOOD APPLYING MACHINE FOR MILK BOTTLES

John T. Eubank, Sherman, Tex., assignor, by mesne assignments, to Package Machinery Company, Springfield, Mass., a corporation of Massachusetts Application November 6, 1931. Serial No. 573,497

14 Claims. (Cl. 226—80)

This invention relates to apparatus having for its general object the conforming of a sanitary flexible hood about the pouring lip and neck portion of a bottle such as is used in packaging milk. The invention is however, by no means to be considered as limited in its application to a milk bottle.

Other objects of the invention will appear as the following description of an illustrative and practical embodiment thereof proceeds.

In the drawings which accompany the specification and form a part thereof and in which the same characters of reference have been employed to designate identical parts throughout the several figures:

Figure 1 is a perspective front view of the machine;

Figure 2 is a plan view, taken in a plane above the level of the table, certain shafts being shown in section;

Figure 2a is a perspective view showing a detail of construction;

Figure 3 is a vertical section taken along the line 3—3 of Figure 2;

Figure 4 is a plan view partly in section showing certain features of the tape feeding and cutting mechanism;

Figure 5 is a similar view showing the swinging plate which brings the tape into contact with the neck portion of the bottle;

Figure 6 is a perspective view of the sliding carriage which carries the tape feeding mechanism;

Figure 7 is a vertical section through the hood conforming mechanism and its appurtenant parts, the bottle being shown in its relation to said mechanism prior to the conforming operation;

Figure 8 is a similar view showing the hood partially conformed;

Figure 9 is still a similar view also showing the parts in the position of elevation assumed when the constricted means is operating, and also showing a portion of the bottle elevating means;

Figure 10 is a vertical elevation partly in section indicating the bottle rotating means;

Figure 11 is a section taken along the line 11—11 of Figure 10;

Figure 12 is a fragmentary view similar to that shown in Figure 11, the advancing block and other mechanism being omitted;

Figure 13 is a perspective view of the sliding carriage supporting the bottle rotating mechanism;

Figure 14 is a perspective view of the upper face of the carriage;

Figure 16:
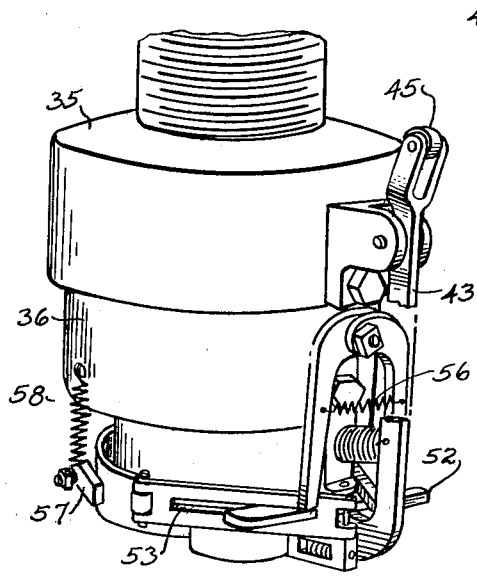
Figure 16 is a perspective view of the conforming head showing the constricting mechanism.

Referring now in detail to the several figures, the numeral 1 represents in general a base comprising a table 2 and supporting elements 3. A shaft 4 is supported transversely beneath the table 2 and is rotated by means of a flanged drum 5 having a metallic spring band 6 wound thereabout for substantially one revolution, being fixed thereto at one end and having the other end pivotally secured to a foot operated lever 7, which lever is pivotally secured to a fixed part of the machine. When the foot lever is depressed, the spring band 6 unwinds, rotating the shaft 4 in one direction. On one end of the shaft a pulley 9 is fixed having a cord or cable 10 wound thereabout from which is suspended a weight 11. When the foot lever is relieved of pressure, the weight rotates the shaft 4 in the opposite direction, again winding the spring band 6 about the drum 5. Through this shaft the various instrumentalities by which the functions of the machine are performed, are actuated in proper synchrony.

Above the table 2 are shown 3 units, all actuated from the shaft 4. The unit designated by the reference character 12 elevates and rotates the bottle, the unit 13 cooperates with the elevated bottle to conform and constrict the hood, while the unit 14 feeds the tape by which the hood is secured in place on the bottle, cuts the tape, and presents the end of the tape into contact with the hood whereupon, by rotation of the bottle, the tape is made to encircle the hood. A moistening or adhesive applying device, not shown in Figure 1 but indicated at 15 in Figure 19, may be associated with the unit 14.

Referring now to unit 12, it is shown on an enlarged scale in the lower part of Figure 9 and in Figure 10. It comprises a preferably cylindrical support 16 reciprocable vertically through a hole in the table 2. It is actuated by means of a rod 17, the lower end of which is preferably provided with an anti-friction roller 18 and bears against the periphery of a suitably shaped cam 19 on the shaft 4.

Figure 7 shows that when the bottle is resting upon the support 16, a space intervenes between the top of said bottle and the cup-shaped element 20 of the conforming unit. This space is transversely intersected by the plane of a channeled frame 21 adapted to be fed with flat sheets of flexible material such for instance as "Cellophane" from which the hood is to be conformed. When the bottle rises with the support 16, through the instrumentality of the cam 19, the sheet 22 which for convenience will hereinafter be referred to as "Cellophane", is carried upwardly on the top of the bottle into the cup-shaped element, being conformed to the top and pouring lip of the bottle and as shown in Figure 8, the edge portions of the "Cellophane" being free as shown at 23 in Figure 8.

The cup-shaped element or conformer 20 is unitary with a stub shaft 24 having a thrust collar 25 surmounted by a bearing 26, the thrust collar and bearing being housed within a chamber formed by the counter-bored lower end of a cylindrical slide 27, the lower portion of which is closed by a ring nut 28 surrounding the shaft 24. It is obvious from an inspection of Figure 7 that the conformer is rotatable with respect to the cylindrical slide and ring nut, as well as reciprocable therewith and that at the time the bottle is rotated by the support 16, the sheet of "Cellophane" is held frictionally under pressure to the mouth of the bottle by the conformer and forced to rotate with said bottle.

The cylindrical slide 27 telescopes within a guiding sleeve 29 having a limited range of movement determined by the distance between the shoulder 30 on the ring nut and the shoulder 31 at the lower end of the guide sleeve. The cylindrical slide is sufficiently less in diameter than the guide sleeve to make room for an internal ring 32 fixed within the guide sleeve and forming an abutment between which, and the shoulder 30 a spiral spring 33 is held in compression. The spring normally holds the shoulders 30 and 31 apart, a ring 34 on the cylindrical slide cooperating with the internal ring 32 to limit the further expansion of the spring 33. The initial movement of the conformer 20 after having been contacted by the mouth portion of the bottle, the "Cellophane" sheet intervening, is solely reciprocatory and acts to bring the shoulder 30 into contact with the shoulder 31 of the guide sleeve. The latter is slidable with respect to a fixed plate 35 and further upward movement of the bottle and conformer carries the guide sleeve upwardly through the plate 35 carrying with it the supporting sleeve 36, upon which the constricting mechanism is mounted. The upward limit of travel of the conformer, cylindrical slide and guide sleeve is reached when the posts 37 contact with the inner face of the fixed plate 35.

It will be understood that the aggregate upward travel of the conformer and its associated mechanism is determined by the throw of the cam 19 and that the bottle forms a link in the line of force transmission. Since bottles of a given capacity may vary slightly in height, means must be provided for slight variations in the height of the bottle so that when the posts 37 engage the plate 35 the bottle will not be crushed nor any part of the machine become jammed and damaged. This means comprises a cushioned plate 38 arranged on top of the support 16, as clearly shown in Figure 9. This plate is supported in slightly spaced relation with respect to the top of the support 16 by a strong spring 39. It is attached to said drum by means of pins 40 secured to said plate and sliding through apertures in said head, the pins having internal retaining means larger than said apertures. In the event that pint bottles are employed instead of quart bottles, for example, a filler block 39 is suitably secured to the plate 38 in order to bring the height of the pint bottle up to that of the quart size.

The constricting mechanism operates to close in on the free edge portion 23 of the Cellophane and to press it into close conformation to the surface of the bottle beneath the pouring lip. The constricting mechanism comprises a plurality of arcuate links 41 pivotally joined in series and so arranged that when they are drawn together their inner surfaces form a circumference substantially the size of the zone of the bottle which they encompass at the time the "Cellophane" is pressed into place. The links are suspended, as shown in Figure 16 from the supporting sleeve 36. Normally the series of links is sufficiently widely expanded to permit the passage of the conformer 20, as shown in Figure 7. The spread position of the series of links is indicated in broken lines in Figure 19. The gap or break in the circle formed when the links are in spread position is filled by an arcuate member 42 which automatically withdraws itself from the gap as the links come together when being contracted into a circle. The purpose of having the links and arcuate member form a complete encircling structure is to knock down the free flaring edge portions of the "Cellophane" sheets, as the conformer is pushed upwardly beyond the zone of the constricting means in the course of the upward movement of the bottle.

The series of links 41 are contracted by means of a rocking lever 43 pivotally mounted in a lug 44 mounted on the supporting sleeve 36. When said sleeve approaches its uppermost position, the upper end of the rocking lever 43 which is provided with an anti-friction roller, contacts with the inclined cam 45 and is deflected inwardly, throwing the lower end of said lever outwardly. It will be observed in Figures 17, 18 and 19 that the lower end 46 of the lever 43 is pivotally connected to a pin 47 which bridges a slot between the bifurcations 48 which extend outwardly from the arcuate member 42. Thus, the initial outward swing of the lever 43 withdraws the arcuate member 42 from the gap between the adjacent links 41, permitting them to come together in the contraction of the series of rings. Links 49 are pivotally connected at their opposite ends to the bifurcations 48 and to the links 41 adjacent the gap spanned by the arcuate member 42 therefore, when said arcuate member moves outwardly, the links 49 draw the adjacent links 41 together, contracting the entire series.

An equalizing device is provided for maintaining the movement of the links 41 on opposite sides of the gap symmetrical. This device comprises an upright bar 50 mounted at its upper end upon a stud 51, the latter being fixed to the supporting sleeve 36. The lower end of said bar is secured to or made integral with a transverse plate 52, the ends of which pass through slots 53 formed in the links 49 adjacent the aforementioned gap. A pair of arms 54 is pivotally mounted on the stud 51 having their ends bearing on the outer sides of the links 41, as shown at 55 in Figure 18. Said arms are drawn together by a spring 56, shown in Figure 16.

The plate thus acts as a guide determining the movement of the links 49 in a horizontal plane, while the arms 54 continually press said links toward one another.

The side of the series of links 41 opposite the contracting mechanism is supported by means such as the arcuate bar 57 suspended from the supporting sleeve 36 by lugs 58.

As the supporting sleeve 36 rises and the lower end of the arm swings outwardly through engagement of the roller at the upper end of said arm with the cam 45, the arcuate member 42 is pulled out, eventually to the full line position shown in Figure 19, while the links 49 are brought toward one another contracting the series of links 41 about the neck of the bottle, below the pouring lip, pressing the "Cellophane" into conformation with the bottle. A banding operation, presently to be described, is then performed, after which the bottle is lowered permitting the conformer and its associated parts to descend, through the expansion of the spring 59 which works between the fixed plate 35 and the supporting sleeve 36, assisted by the spring 33. In this descending movement, the roller at the top of the arm 43 parts company with the cam 45, and the lower end of the arm 43 is drawn inwardly by means of the spring 60, moving the arcuate member 42, together with its bifurcations 48 inward, spreading the links 49 and expanding the entire series of links 41 so that the bottle with the hood applied thereto may freely descend to its initial level.

Figure 17:
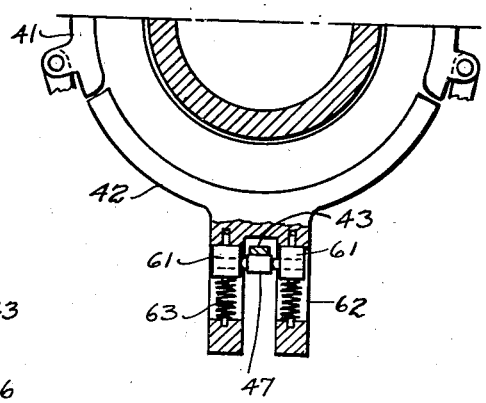
Figure 17 is a section taken along the line 17—17 of Figure 18.
Figure 18:
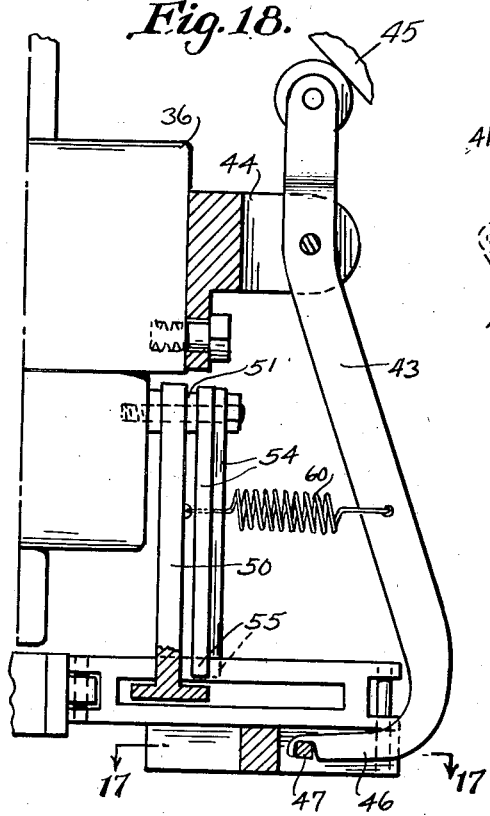
Figure 18 is a section taken along the line 18—18 of Figure 19.

It may happen that the necks of the bottles may not be of exactly the same circumference so that a slight yield must be provided between the arm 43 and the series of constricting links. This yield is produced by a pair of blocks 61 sliding in horizontal slots 62 in the bifurcations 48, as shown in Figure 17. Springs 63 mounted in said slots normally press the blocks against the inner ends of said slots, the yielding being in the opposite direction. The pin 47 is mounted in said blocks so that if the series of links 41 encounters the irresistible resistance of an abnormally large bottle neck, the springs 63 will yield to the excess pressure.

Figure 19:
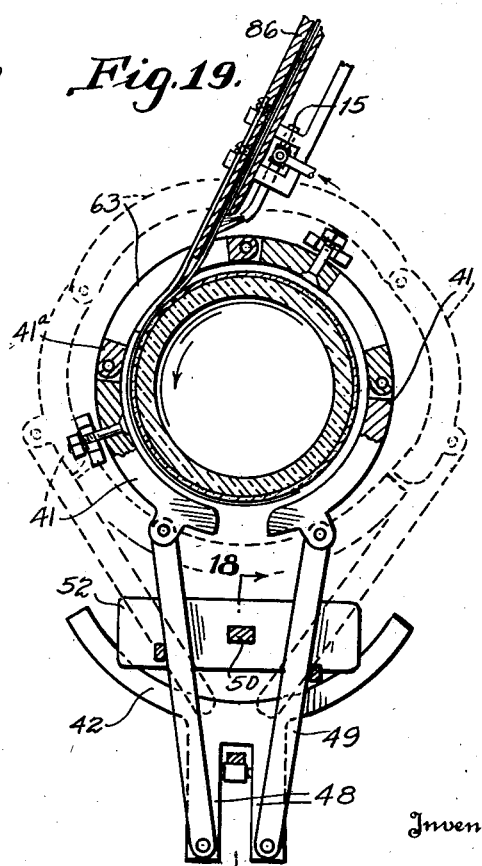
Figure 19 is a transverse section, showing the constricting mechanism in open and constricted position.
Figure 15:
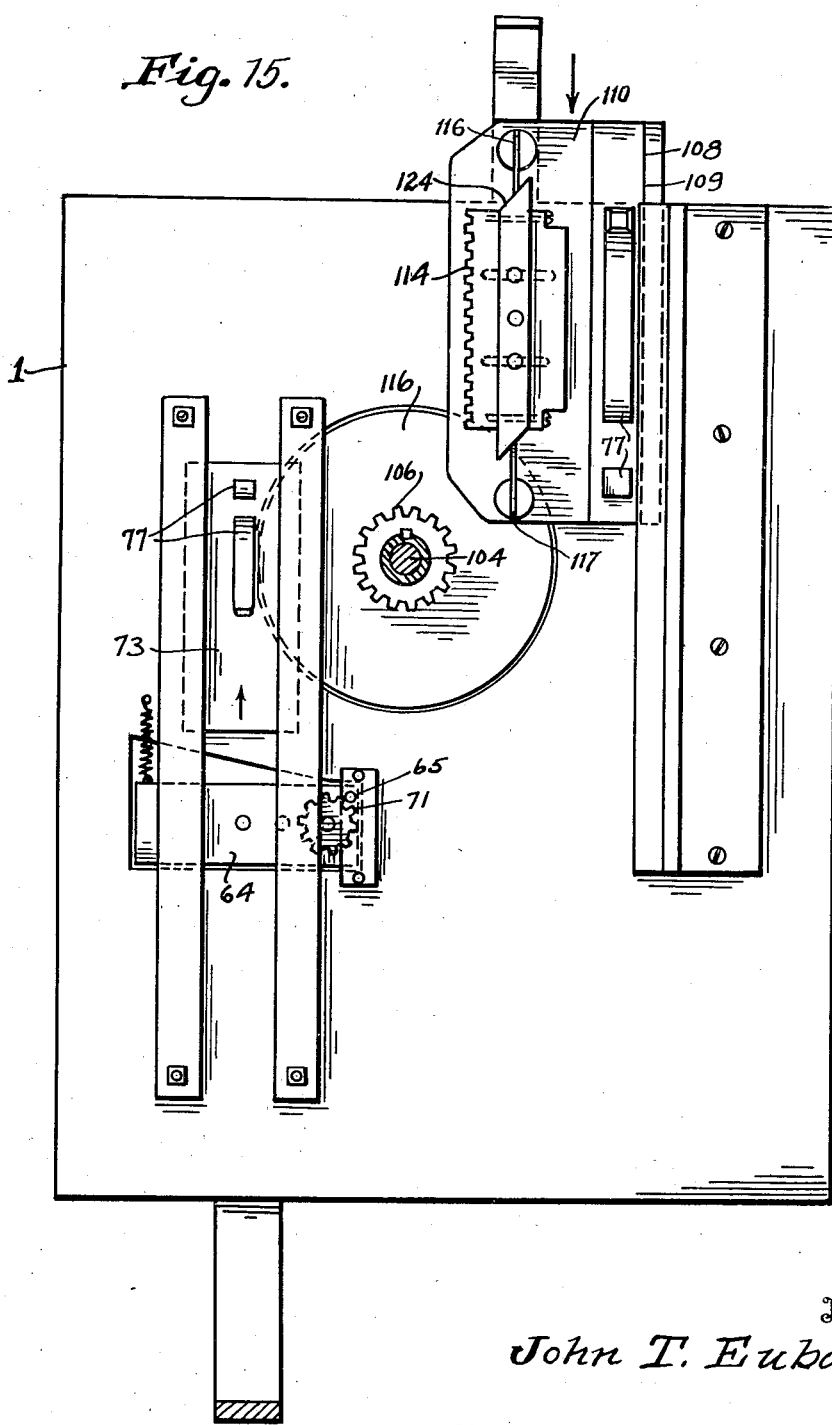
Figure 15 is a bottom plan view of the table.

One of the links 41, that designated as 41a, in Figure 19, is provided with a cut away portion or slot 63 giving access to the banding or taping device and it will be understood that the contracting mechanism does not grip the "Cellophane" sheet with such closeness as to prevent the sheet rotating with the bottle nor to interfere with the circumferential application of the band as the bottle rotates.

Referring now to the unit 14, which, as has been previously stated, concerns itself with the feeding, cutting and applying an encircling tape or band to the "Cellophane" in the constricted zone, while held by the constricting mechanism, the table is provided with a plate 64 hinged adjacent one corner as indicated at 65 and oscillatable through a limited range for a purpose soon to be described. A pair of shafts 66 and 67 are journalled up-rightly in said plate and extend for a short distance below the level thereof. The shaft 67 concerns itself with feeding the tape. At its upper end, it has a friction roller 68 cooperating with an idling friction roller 69 to pass a strip of tape 70 therebetween.

Figure 2 indicates that the friction rollers are on the same level with the series of constricting links 41, on the one hand, and on the other hand with a reel of tape. The tape may be of any desired nature either with adhesive already applied, or having the adhesive supplied thereto through the conduit 15. Where the tape comes already gummed, the conduit 15 may supply merely moisture. If desired, a volatile solvent for the waterproof surface of "Cellophane" may be supplied by the conduit 15 which will prepare a surface for the adhesion of the tape.

Referring once again to Figure 3, the shaft 67 is provided adjacent its lower end with a gear 71. This gear transmits intermittent unidirectional rotary movement to the shaft 67 by means of a rack 72 freely mounted on a carriage 73 which carriage slides in tracks 74 on the under side of the table and actuated by an arm 75 carried by the shaft 4. The upper end of said arm acts between two fingers 76 and 77 secured to the bottom of the carriage 73. The rack 72 is held in a neutral position by aligned leaf springs 78 and 79 fixed thereto at opposite ends and when in this neutral position the teeth of the rack are out of the path of the gear 71. A cam bar 80 is secured longitudinally of the rack having oppositely beveled ends both of which lie normally in the longitudinal projected path of a roller 81 secured to a stud which projects from the lower face of the plate 64. When the carriage is moved forwardly, that is to say, in the direction of the arrow in Figure 6, the roller 81 engages the end 82 of the cam bar forcing the rack into the path of the gear and whilesoever the roller travels against the longitudinal side 83 of said cam bar, the rack is maintained in the path of said roller. When the roller reaches the opposite end of the cam bar, the rack is released, springing back to its neutral position under the urge of the springs 78 and 79. When the foot pressure on the shaft 4 is released and said shaft rotates reversely under the pull of the weight 11, the carriage recedes and the roller engages the opposite end 84 of the cam bar and travels along the opposite longitudinal side thereof, holding the rack positively out of the path of the gear.

Figure 2 shows a support 85 carrying a tubular tape guide 86 of flat cross section. The support 85 is secured to an upright 87 carried by the oscillating plate 64 and when that plate oscillates the support together with the tubular guide 86 also oscillates bringing the end of the tubular guide into a position of tangency to the neck of the bottle, through the slot or cut away portion 63 formed in the link 41a.

The duration of engagement of the gear 71 with the rack 72 is timed to be sufficient to feed out enough tape between the rollers 68 and 69 to extend from the cutting point indicated at 88 in Figure 2 to a point slightly beyond the free end of the tubular guide as indicated at 89.

The shaft 66 merely oscillates and is provided at its upper end with an arm 90 to which is pivotally attached a link 91 extending toward the tape 70 and pivotally secured to an oscillating knife 92. The latter being pivoted at such a point that when actuated, it swings in a path which intersects the path of the tape. The knife operates against a shearing block 93 suitably perforated as at 94 to provide for the passage of the tape. The lower end of the shaft 66 is provided with a collar 95 having angularly disposed lugs 96 and 97, the former of which normally lies in the path of a pin 98 upstanding from the carriage 73. At about the end of the forward movement of the carriage the pin 98 strikes the lug 96, oscillating the shaft 66 and causing the knife 92 to oscillate against the shearing block severing the tape. This oscillation of the shaft brings the pin 98 between lugs 96 and 97 and on the retrogressive movement of the carriage, the pin colliding with the lug 97 restores the shaft 66 to its normal position withdrawing the knife to its normal inactive position as shown in Figure 3.

By the two operations last described, that is to say, the intermittent rotation of the shaft 67 and the oscillation of the shaft 66, the proper length of tape is fed out through the tubular guide 86 and cut off. It now remains for the free end of this tape to be brought into contact with the "Cellophane" hood, in the zone of its constriction. This is accomplished by the oscillation of the plate 64 about its hinged connection 65 which in turn oscillates the upright 87 and swings the support 85 together with the tubular guide 86 in a direction toward the bottle.

Oscillation of the plate 64 is brought about as follows: A roller 99 is mounted on a stud projecting from the underneath surface of the plate 64 at a point remote from its hinged connection. The carriage 73 is provided with an upstanding frame 100, the rectilinear side 101 of which is normally engaged by the roller 99. The frame near its rearward end has an offset 102 forming a depression which allows the roller some freedom of lateral movement with respect to the carriage 72. It will be noted that this freedom of movement is provided only at the end of the forward stroke of the carriage, that is, after the feeding operation has been completed, and after the pin 98 has actuated the tape cutting mechanism. While the roller 99 is in engagement with the side 101 of the frame 100, the oscillatable plate 64 is maintained in its normal position, as shown in full lines in Figure 2. It will be noted from this figure that a spring 103 tends to bias this plate away from its normal position. When the roller 99 reaches its position of relative freedom, as indicated in Figure 5, the spring 103 oscillates the plate thereby swinging the tubular guide and the tape therein contained, toward the bottle, the end of said tape making contact with the "Cellophane" hood. Figure 2 shows that the tubular guide 86 is terminated by a flat leaf spring on the outer side, which presses the tape yieldingly against the hood through the slot in the link 41a.

When the carriage returns to its normal position, the roller 99 rides up on to the rectilinear side 101 of the frame 100 bringing the plate and its associated parts back to normal position. This does not occur, however, until the bottle has rotated, thereby encircling the neck portion in the constricted zone thereof with a band of tape, the rotation of the bottle taking place while the roller 99 is in the off-set 102.

The upper portion of the rod 17 is provided with a rotatable extension 104, a suitable bearing 105 intervening between said rod and extension. The extension 104 is provided with a gear 106 which when actuated by suitable means rotates the extension 104 and with it the support 16, the bottle and the conformer 20 which are all in frictional contact at the time when rotation takes place. The gear 106 is periodically actuated through a reciprocatory carriage 107 similar in many respects to the carriage 73 previously described. The carriage 107 as will be clearly seen in Figure 10 runs in a longitudinal track or guideway, for which purpose it is provided with the flanges 108 and 109 on one side. The carriage is reciprocated by an oscillating arm 110 fixed to the shaft 4 and interdigitating between the fingers 111 and 112 extending downwardly from the carriage 107. Figure 13 shows the finger 112 partly broken away. A stop 113 is shown in Figure 1 for positively limiting the rearward movement of said carriage.

Suspended beneath said carriage is a rack 114 similar to the rack 72 and having a cam bar 115 similar to the cam bar 80. The rack is normally maintained in neutral position by leaf springs 116 and 117 suitably anchored, the rack being carried by studs 118 playing in lateral slots 119. A roller 120 is supported on a bracket 121 fixed to the non-rotatable part of the rod 17 and when said rod is in its uppermost position, said roller normally extends into the path of longitudinal movement of the cam bar 115.

The position of the parts shown in Figure 10 is that assumed when the cam 19 is at the top of its throw. At this time as has previously been described, the constricting mechanism is in clamping relation to the neck of the bottle and the enveloping hood. It is of course, understood that before the cam has reached the position shown in Figure 10, the gear 106 and the roller 120 will be at a lower level and out of operative relation with the rack 114 and the rack bar 115, respectively.

With the parts in the position shown in Figure 10, when the carriage 107 is moved forwardly under the action of the arm 110, the roller 120 which normally occupies the position shown in broken lines in Figure 11, engages the forward inclined end 122 of the cam bar and rides upon the rectilinear face 123 of the cam bar, forcing the rack 114 into mesh with the gear 106, against the tension of the springs 116 and 117.

Rotation of the gear 106 now takes place through further forward movement of the carriage 107. As said carriage approaches the end of its range of travel, the roller 120 rides off of the rectilinear face 123, permitting the rack 114 to spring back, out of mesh with the gear 106. When the carriage starts on its return trip, the roller 120 engages the opposite inclined end 124 of the cam bar, forcing the rack 42 further away from the gear 106 and holding it away until it again reaches its original position. It will be understood that when the roller rides off of either side of the cam bar, the bar does not return to a position of engagement with the gear 106 but maintains a neutral position.

The operation of the machine has, it is believed, been succinctly described in stages in connection with the construction of the several units of the machine. Referring to Figure 2, it will be understood that when the tubular guide 86 has oscillated and placed the end of the tape against the "Cellophane" hood which is held conformed to the neck of the bottle, the moistened adhesive at the end of the tape or the solvent for "Cellophane" which it carries at once causes an adhesion between the tape and hood so that when the bottle rotates in response to the rotating mechanism just described, the portion of tape previously cut off at the point 88 will be drawn out of the tubular guide 86 and wrapped around the neck of the bottle in the zone of the constricting mechanism. The length of the tape is sufficient to encircle the neck of the bottle with a slight lap, and the arc of rotation produced by the traverse of the rack 114 against the gear 106 is sufficient to rotate the bottle a little more than one revolution. Thus the tape is applied, snugly and tightly, maintaining the hood conformed to the neck of the bottle with a substantially airtight engagement.

When the foot of the operator is removed from the lever 7, the shaft 4 reverses the arms 75 and 110 brings the carriages 73 and 107 back to normal position, and the cam 19 is reversed, permitting the rod 117 and with it the conforming member and the bottle to drop, the bottle continuing to descend after the conforming member has reached its lower-most position, the bottle being thus released so that it may be removed manually and replaced by another bottle which is to be hooded.

While I have in the above description disclosed a practical and commercial form of the invention, it is to be understood that the details of construction as shown and described are merely by way of example and not to be restrictive in their bearing upon the breadth of the invention.

What I claim is:

1. Machine for applying hoods to receptacles comprising a constricting device, and a train of co-axial, serially actuated, reciprocatory mechanisms including receptacle elevating means, hood conforming means, and means for operating said constricting device, said train having a gap between said elevating means and said conforming means for receiving a receptacle, and of greater height than said receptacle when said elevating means is in its base position, leaving space for feeding a sheet of hood material to a position between said receptacle and conforming means, said receptacle serving as a motion transmitting link in said series, for enabling the actuation of said conforming means and said constricting device, the latter including a normally expanded, contractile encircling construction including serially connected links surrounding the axis of said series in the zone of the skirt of said hood when the receptacle is in its ultimate position of elevation.

2. Machine for applying hoods to receptacles comprising a constricting device, and a train of co-axial, serially actuated, reciprocatory mechanisms including receptacle elevating means, hood conforming means, and means for operating said constricting device, said train having a gap between said elevating means and said conforming means for receiving a receptacle, and of greater height than said receptacle when said elevating means is in its base position, leaving space for feeding a sheet of hood material to a position between said receptacle and conforming means, said receptacle serving as a motion transmitting link in said series, for enabling the actuation of said conforming means and said constricting means, the latter including a normally expanded, contractile encircling construction including serially connected links surrounding the axis of said series in the zone of the skirt of said hood when the receptacle is in its ultimate position of elevation, and means for rotating said receptacle when said constricting means is in clamped relation to said hood.

3. Machine for applying hoods to receptacles comprising a constricting device, and a train of co-axial, serially actuated, reciprocatory mechanisms including receptacle elevating means, hood conforming means, and means for operating said constricting device, said train having a gap between said elevating means and said conforming means for receiving a receptacle, and of greater height than said receptacle when said elevating means is in its base position, leaving space for feeding a sheet of hood material to a position between said receptacle and conforming means, said receptacle serving as a motion transmitting link in said series, for enabling the actuation of said conforming means and said constricting means, the latter including a normally expanded, contractile encircling construction including serially connected links surrounding the axis of said series in the zone of the skirt of said hood when the receptacle is in its ultimate position of elevation, means for applying a binding strip adhesively to a point on said hood in said constricted zone, and means for rotating said receptacle upon the application of said strip for winding said strip circumferentially of said hood.

4. Machine for applying hoods to receptacles as claimed in claim 1, said train of mechanisms having the parts immediately associated with said bottle, both above and below, rotatably mounted, and means synchronized with said elevating mechanism for rotating said bottle and hood while said constricting device is in contracted position.

5. Machine for applying hoods to receptacles comprising a constricting device adapted to surround said receptacle in the zone of said hood, and a tape applying arm normally away from said receptacle but swingable to a position for applying tape to the hood on said receptacle in the zone of said constricting means, a train of co-axial serially actuated reciprocatory mechanisms including receptacle elevating means, hood conforming means, and means for operating said constricting device, said train having a gap between said elevating means and said conforming means for receiving said receptacle, and of greater height than said receptacle when said elevating means is in its base position, leaving space for feeding a sheet of hood material to a position between said receptacle and conforming means, said receptacle serving as a motion transmitting link in said series, for enabling the actuation of said conforming means and said constricting means, the latter including a normally expanded, contractile encircling construction including serially connected links surrounding the axis of said series in the zone of the skirt of said hood when the receptacle is in its ultimate position of elevation, said train of mechanisms having the parts immediately associated with said bottle both above and below, rotatably mounted, and means synchronized with said elevating mechanism and tape applying arm for touching the tape to said hood and rotating said receptacle while said constricting device is in contracted position.

6. Machine for applying hoods to receptacles comprising a constricting device and a train of co-axial serially actuated reciprocatory mechanisms including receptacle elevating means, hood conforming means, and means for operating said constricting device, said train having a gap between said elevating means and said conforming means for receiving a receptacle, and of greater height than said receptacle when said elevating means is in its base position, leaving space for feeding a sheet of hood material to a position between said receptacle and conforming means, said receptacle serving as a motion transmitting link in said series for enabling the actuation of said conforming means and said constricting device, the latter including when in expanded position, a series of pivotally connected links and a withdrawable arcuate member, the means for operating said constricting device including means for withdrawing said arcuate member leaving a gap, closed by said series of links when the latter assume their contracted position.

7. Machine for applying hoods to receptacles comprising a constricting device and a train of coaxial serially actuated reciprocatory mechanisms including receptacle elevating means, hood conforming means, and means for operating said constricting device, said train having a gap between said elevating means and said conforming means for receiving a receptacle, and of greater height than said receptacle when said elevating means is in its base position, leaving space for feeding a sheet of hood material to a position between said receptacle and conforming means, said receptacle serving as a motion transmitting link in said series, for enabling the actuation of said conforming means and said constricting device, the latter including a normally expanded contractile encircling construction surrounding the axis of said reciprocatory mechanism in the zone of the skirt of said hood, including a series of pivotally connected links and a withdrawable arcuate member between the ends of said series of links, a rocking lever connected to appropriate linkage for withdrawing said arcuate member and contracting said series of links, and means forming a cam engageable by said rocking lever when the receptacle approaches its ultimate position of elevation for rocking said lever and operating said constricting device.

8. Machine for applying hoods to receptacles, as claimed in claim 7, said linkage including an element providing yielding lost motion between said rocking lever and said hood.

9. Machine for applying hoods to receptacles comprising a constricting device adapted to surround said receptacle in the zone of said hood and a tape applying arm normally away from said receptacle but swingable to a position for applying tape to the hood on said receptacle in the zone of said constricting device, a train of co-axial serially actuated reciprocatory mechanisms including receptacle elevating means, hood conforming means, and means for operating said constricting means, said train having a gap between said elevating means and said conforming means for receiving a receptacle, and of greater height than said receptacle when said elevating means is in its base position, leaving space for feeding a sheet of hood material to a position between said receptacle and conforming means, said receptacle serving as a motion transmitting link in said series for enabling the actuation of said conforming means and said constricting device, means synchronized with said elevating mechanism and tape applying mechanism for touching the tape to said hood and rotating said receptacle while said constricting means is in contracted position, the means for swinging said tape applying arm comprising an oscillatable plate on which said arm is mounted.

10. Machine for applying hoods to receptacles as claimed in claim 9, including shafts associated with said plate, tape feeding means operated by one shaft for feeding tape to said arm, a cutter operated by the other shaft for severing the length of tape fed to said arm from a continuous source of tape, and operating means for said shafts synchronized to produce the feeding and cutting functions in properly timed sequence.

11. Machine for applying hoods to receptacles comprising means for conforming the hood to the receptacle, means for applying a tape adhesively to said hood, and means for rotating said receptacle so as to encircle the latter with a band of tape, said tape applying means comprising an oscillatable frame, a guide arm carried by said frame for bringing the tape into contact with the hood on said receptacle, and letting it feed out as the receptacle rotates, feeding means for supplying a proper length of tape to said guide arm, and cutting means for cutting off the proper length from a continuous supply of tape.

12. Machine for applying hoods to receptacles as claimed in claim 11, intermittently operated shafts respectively actuating said feeding means and cutting means, a sliding carriage, means for operating said carriage, a rack arranged to be brought into mesh with a gear on the feeding means shaft, said rack being spring mounted on said sliding carriage, to oscillate bodily transversely of the path of movement of said carriage with respect to a neutral intermediate position, a cam on said rack, and fixed means engaging said cam to force said rack out of its neutral position and into mesh with said gear, for rotating said feeding means shaft through the movement of said carriage.

13. Machine for applying hoods to receptacles as claimed in claim 11, including intermittently operated shafts respectively actuating said feeding means and cutting means, a sliding carriage, means for operating said carriage, a rack arranged to be brought into mesh with a gear on the feeding means shaft, said rack being spring mounted on said sliding carriage, to oscillate bodily transversely of the path of movement of said carriage with respect to a neutral intermediate position, a cam on said rack, and fixed means engaging said cam to force said rack out of its neutral position and into mesh with said gear, for rotating said feeding means shaft through the movement of said carriage, and means on said carriage coacting with means on said cutting means shaft for oscillating said cutting means shaft.

14. Machine for applying hoods to receptacles as claimed in claim 11, including intermittently operated shafts respectively actuating said feeding means and cutting means, a sliding carriage, means for operating said carriage, a rack arranged to be brought into mesh with a gear on the feeding means shaft, said rack being spring mounted on said sliding carriage, to oscillate bodily transversely of the path of movement of said carriage with respect to a neutral intermediate position, a cam on said rack, and fixed means engaging said cam to force said rack out of its neutral position and into mesh with said gear, for rotating said feeding means shaft through the movement of said carriage, means for biasing said frame to bring said arm into tape applying position with respect to said hood, means carried by said carriage, and engaging means on said frame for normally inhibiting the action of said biasing means, said inhibiting means having an off-set to permit the swinging of said carriage into tape applying position under the urge of said biasing means.

JOHN T. EUBANK.